United States Patent [19]

Polach

[11] Patent Number: 4,689,951
[45] Date of Patent: Sep. 1, 1987

[54] DEVICE FOR REMOVING SOLID PARTICLES, PARTICULARLY SOOT, FROM EXHAUST GAS OF AN INTERNAL COMBUSTION ENGINE

[75] Inventor: Wilhelm Polach, Möglingen, Fed. Rep. of Germany

[73] Assignee: Robert Bosch GmbH, Stuttgart, Fed. Rep. of Germany

[21] Appl. No.: 813,225

[22] Filed: Dec. 23, 1985

[30] Foreign Application Priority Data

Jan. 8, 1985 [DE] Fed. Rep. of Germany ....... 3500375

[51] Int. Cl.$^4$ .............................................. F01N 3/02
[52] U.S. Cl. ...................................... 60/275; 55/127; 55/152; 60/311
[58] Field of Search .................... 60/311, 275; 55/127, 55/152

[56] References Cited

U.S. PATENT DOCUMENTS 4,380,900 4/1983 Linder .................................. 60/275
4,478,613 10/1984 Brettschneider ..................... 60/311

FOREIGN PATENT DOCUMENTS 2018447 11/1971 Fed. Rep. of Germany ........ 55/152
565712 7/1977 U.S.S.R. ................................ 55/152

Primary Examiner—Douglas Hart
Attorney, Agent, or Firm—Michael J. Striker

[57] ABSTRACT

A device for removing soot particles from exhaust gas of an internal combustion engine includes an electrical filter having a tubular housing and a central electrode in the form of a cylindrical shell coaxially arranged in the filter housing. The cylindrical shell is supported at its ends by insulators and is provided with a plurality of juxtaposed discharge points. The wall thickness of the cylindrical shell is about 0.05 mm and the discharge points are cut out in the wall of the cylindrical shell and being bent in radial direction toward the inner wall of the filter housing. The sides of the segments connecting the discharge points are oriented in the direction of the center axis of the electrode.

4 Claims, 3 Drawing Figures

1

DEVICE FOR REMOVING SOLID PARTICLES, PARTICULARLY SOOT, FROM EXHAUST GAS OF AN INTERNAL COMBUSTION ENGINE

BACKGROUND OF THE INVENTION

The present invention relates to a separator of solid particles, particularly of soot from exhaust gas of an internal combustion engine by means of an electrical filter which includes a source of direct current high voltage, a tubular housing connected to the positive pole of the voltage source and an axially arranged central electrode carrying a plurality of electrical discharge points directed toward the inner wall of the filter housing and being spaced from the latter.

In known devices of this kind called also soot deflectors (German publication DE-OS No. 31 41 156) the electric discharging points are arranged on the upper surface of the so-called spray discharge discs, the latter being arranged parallel to each other on a support extending parallel to the filter housing. When high voltage is applied to the discharge point, a corona discharge will occur causing ionization of molecules of the exhaust gas. Electrons freed during the corona discharge land on solid particles, or soot particles in the gas and impart to the particles a negative charge. Consequently, the negatively charged solid particles are attracted to and deposited on the positively charged inner wall of the filter housing. In order to prevent the precipitation of oppositely charged particles on the spray discharge discs and hence the impairment of the corona discharge, the spray discharge discs are constructed of an extremely thin material having for example the thickness of only 0.05 mm, and are clamped to the support only at their center points. In this manner, the tips of the spray discharge discs are brought into vibrations in response to vibrations of the motor vehicle and the deposited particles are shaken off. In practice, however, it has been found that due to high flow speeds in the filter and also due to high shocks from the motor vehicle, the spray discharge discs are subject to a directional vibration flatter and damage each other. To avoid this detrimental effect, the spray discharge discs have been additionally reinforced in the range of the support. Consequently, a relatively heavy central electrode has resulted. A central electrode having increased weight, however, requires for its mount in the filter housing very stable high voltage insulators which must be also increased in size and weight. Large insulators also require substantially more energy for burning the deposited solid particles in comparison with smaller insulators.

SUMMARY OF THE INVENTION

It is therefore a general object of the present invention to avoid the above described disadvantages.

More particularly, it is an object of this invention to provide an improved deflector of solid particles or soot whose central electrode has substantially reduced weight while maintaining sufficient rigidity.

Another object of this invention is to provide such a construction of the central electrode at which the electrical discharge points even at strong vibrations are reliably protected against damage.

Still another object of this invention is to provide such a construction of the central electrode which requires smaller insulators for its support.

In keeping with these objects and with which will become apparent hereafter, one feature of this invention resides, in a device for deflecting solid particles from exhaust gas of an internal combustion engine, in the provision of a central electrode which has the form of a thin walled cylindrical shell arranged concentrically in the tubular filter housing, the cylindrical shell having a plurality of cutout portions delimiting segments provided with electrical discharge points, the cut-out segments being bent radially outwardly toward the inner wall of the filter housing. In this manner, in comparison with prior art central electrode of the same length and of the same efficiency, an up to 80% reduction in weight is achieved. In addition, the size and weight of supporting insulators can be correspondingly reduced, thus achieving additional advantages during the burning of deposited particles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
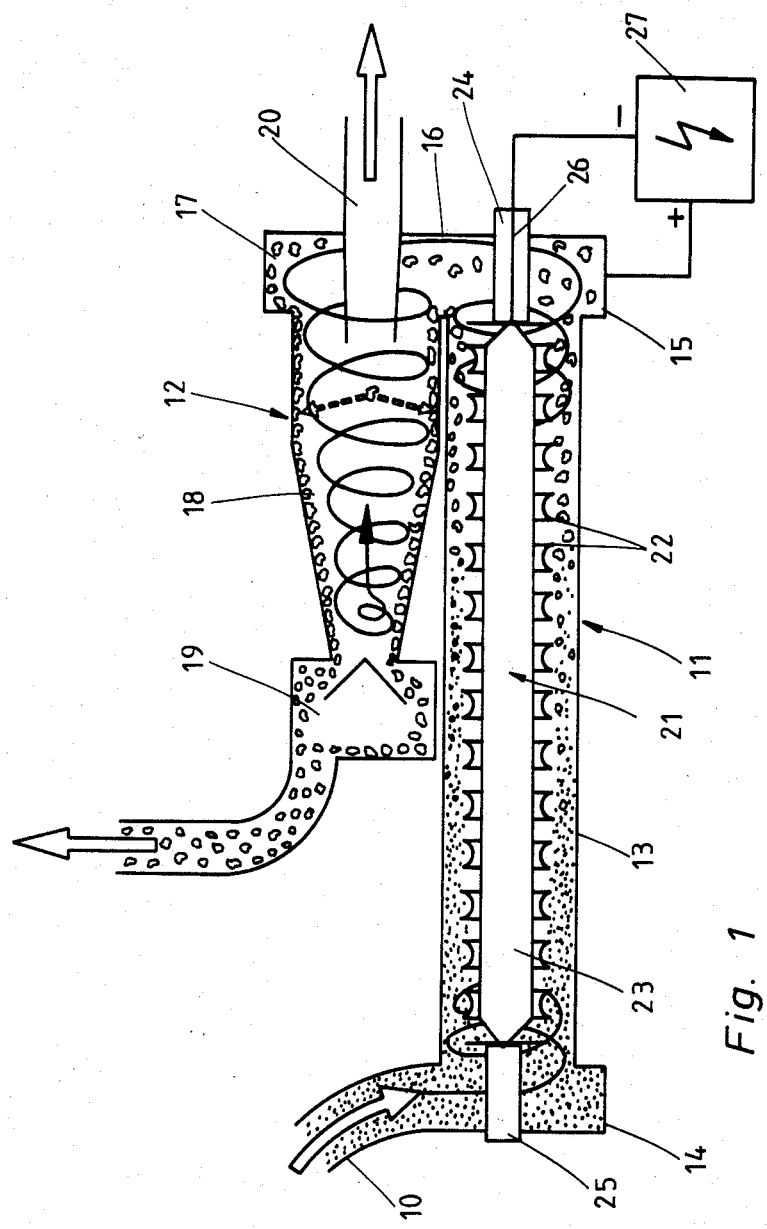
FIG. 1 is a longitudinal cross-section of a schematically illustrated device for removing solid particles from exhaust gas of an internal combustion engine.

Exhaust gas discharged from an exhaust gas collection system of a non-illustrated internal combustion engine is fed through a connection conduit 10 into a device for removing solid particles, particularly soot. In the following description, the device will be called the soot deflector. The soot deflector consists of an electric filter 11 and of a centrifugal type separator 12, for example a cyclone, communicating with the downstream ends of the electric filter 11. The electric filter 11 has a tubular housing 13 whose ends are closed respectively by spiral shaped housing parts 14 and 15. The connection conduit 10 opens tangentially in the inlet spiral shaped housing part 14, whereas another connection conduit 16 branches in tangential direction from the outlet spiral-like housing part 15 and tangentially opens into a flow in cylindrical chamber 17 of the centrifugal separator 12. The center axis of the separator 12 extends parallel to the center axis of the housing 13 of the electrical filter 11. The separator 12, apart from the inlet cylindrical chamber 17, is constructed in conventional manner with a conically converging separation chamber 18, whose open bottom of reduced diameter opens into a collection chamber 19. The separated solid particles or soot are removed from the collection chamber in the direction indicated by arrow, whereas the pollution free exhaust gas is discharged in the outer atmosphere through an immersion tube 20 projecting coaxially into the flow-in cylindrical chamber 17.

Within the tubular housing 13 of the electric filter 11 there is coaxially arranged a central electrode 21 supporting a plurality of opposite electric discharge points 22 spaced apart by a radial distance from the inner wall of the housing 13. According to this invention, the central electrode 21 is designed in the form of a thin walled cylindrical shell 23 whose end portions conically converge toward its central axis. Electrical insulators 24 and 25 are secured to the tips of the conical end portions. Each insulator is fixedly mounted in the central region of corresponding spiral-like end parts 15 and 14 of the housing 13. In this manner, the cylindrical shell 23 is electrically insulated from the surrounding housing 13. An electrical conductor 26 passes through the insulator 24 and connects the central electrode 23 with the negative pole of a DC high voltage source 27. The positive pole of the high voltage source is connected to the tubular housing 13.

Figure 2:
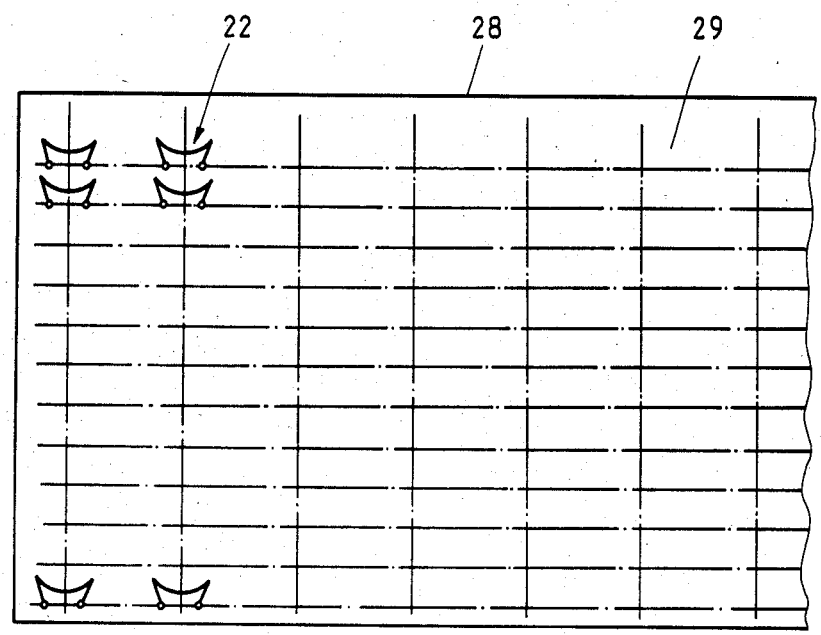
FIG. 2 is a top view of a developed cylindrical jacket of a central electrode according to this invention.
Figure 3:
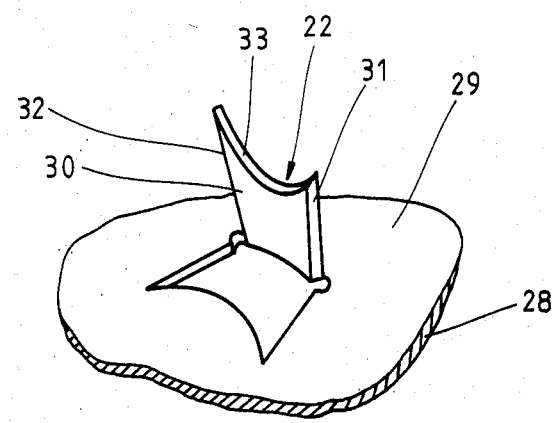
FIG. 3 is a perspective view of electric discharge points according to this invention, shown on an enlarged scale.

It will be seen from FIGS. 2 and 3, the electric discharge points 22 are in the form of trapezoidal segments cutout along three sides from the cylindrical shell 28 and bent outwardly along a fourth side so as to project at right angles relative to the upper surface 29 of the cylindrical shell 28. In this example, each electric discharge point 22 is in the form of a substantially trapezoidal cutout 30 defining two mutually diverging lateral sides 31 and 32 and a concave upper side 33 connecting the ends of the lateral sides. The smaller base side of the cutout 30 is integral with the cylindrical shell 28 and cutout cylindrical segment 30 is bent outwardly toward the inner wall of the surrounding housing 13. The bending sides and hence the curved upper sides of all discharge points are oriented parallel to the center axis of the cylindrical electrode 23. The wall thickness of the cylindrical shell 28 of the electrode 23 and hence the thickness of respective cylindrical segments 30 forming the discharging points amounts to about 0.05 mm.

With advantage, the cylindrical shell 28 of the central electrode 23 is produced of a thin metal sheet material. The contours of the cylindrical segments 30, namely the lateral sides 31 and 32 and the concave line 33 defining the discharging points 22, are removed from the sheet material by etching or stamping. The resulting cutouts and their mutual arrangement is indicated in FIG. 2. The discharging points 22 are stamped out at all cross-sections of indicated horizontal and vertical lines. Then a bending device bends the resulting trapezoidal segments outwards so that all discharge points form right angles with the plane of the metal sheet (FIG. 3). Thereafter the metal sheet material is rolled until longer edges abut one against the other and then the edges are joined together by welding. The ends of the resulting cylindrical shell are drawn toward the center axis to form the conical end portions and are provided with receptacles for the attachment to the supporting insulators 24 and 25.

The operation of the electric filter 11 with the negative center electrode 21 and the positive tubular housing 13 is the same as that of the soot deflector described in the beforementioned German publication DE-OS No. 31 41 156. When a DC high voltage is applied to the negative central electrode 21 and to the positive center housing 11, a luminous or glow layer, the so-called corona occurs at the tips of the projecting segments 30 resulting in a corona discharge. Electrons exiting from respective discharge points 22 at the tips of the segments 30 are accelerated due to the very strong electrical fields between the inner wall of the housing 30 and the central electrode 21 and produce a shock ionization of gas molecules. A part of electrons separated during the shock ionization is deposited on solid particles or soot in the exhaust gas stream. The particles or soot becomes negatively charged and are attracted and deposited on the positive inner wall of the filter housing 13. The radial clearance between the discharge points 22 and the inner surface of housing 13 is the same as the distance between the tubular housing and spray discharge discs in prior art soot deflectors.

While the invention has been illustrated and described as embodied in a specific example of the central electrode of the electrical filter, it is not intended to be limited to the details shown, since various modifications and structural changes may be made without departing in any way from the spirit of the present invention. For example, the contours of the discharge points 22 stamped out from the jacket of the cylindrical shell 23 may have also a different configuration, for example the shape illustrated in FIC. 2 in the DC-OS No. 31 41 156.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for removing solid particles, particularly soot from exhaust gas of an internal combustion engine, comprising an electric filter including a source of direct current high voltage, a tubular filter housing electrically connected to the positive pole of the voltage source, a central electrode in the form of a cylindrical shell arranged coaxially in the filter housing and being electrically connected to the negative pole of the voltage source, the cylindrical shell having a plurality of cutout portions delimiting segments provided with electrical discharge points, said segments being bent radially outwardly toward the inner wall of said filter housing; and the wall thickness of the cylindrical shell being about 0.05 mm so that the entire central electrode is brought into vibrations during the running of the engine.

2. A device as defined in claim 1, wherein said segments cut out in the cylindrical shell are substantially trapezoidal defining a base integral with the cylindrical shell, two lateral sides each forming an acute angle with the upper surface of the cylindrical shell and a concave upper side forming with the lateral sides electrical discharging points.

3. A device as defined in claim 2, wherein the base side and concave side of all segments are oriented in the same direction as the center axis of the cylindrical shell.

4. A device as defined in claim 1, wherein the cylindrical shell is provided at both ends thereof with conical end portions converging toward the center axis, and further comprising electrical insulators engaging the tips of said conical end portions to support the cylindrical shell in said filter housing.

* * * * *